United States Patent

[11] 3,569,920

| [72] | Inventor | Herbert S. Antman |
| | | Elmhurst, N.Y. |
| [21] | Appl. No. | 830,981 |
| [22] | Filed | June 6, 1969 |
| [45] | Patented | Mar. 9, 1971 |
| [73] | Assignee | Edo Corporation |
| | | College Point, N.Y. |

[54] HEADING-SENSING APPARATUS
11 Claims, 4 Drawing Figs.

[52] U.S. Cl. .................................................. 340/5,
340/6, 340/16, 343/113
[51] Int. Cl. .................................................. G01s 3/00
[50] Field of Search ........................................ 340/5, 6,
16, 3 (T); 343/112.4, 113, 102

[56] References Cited
UNITED STATES PATENTS
2,557,900  6/1951  Wallace, Jr. et al. ......... 340/16

Primary Examiner—Richard A. Farley
Attorney—Davis, Hoxie, Faithfull & Hapgood

ABSTRACT: A heading-sensing arrangement employs spaced transmitting and receiving transducers and signal-processing apparatus for determining the relative heading between two vessels displaced in three dimensions. The desired heading is computed by normalizing measured angles between the vessels to account for elevation variations.

INVENTOR
HERBERT S. ANTMAN
BY
Davis, Hoxie, Faithfull & Hapgood
ATTORNEYS

INVENTOR
HERBERT S. ANTMAN
BY
Davis, Hoxie, Faithfull & Hapgood
ATTORNEYS

HEADING-SENSING APPARATUS

This invention relates to navigation equipment and, more specifically, to apparatus for sensing the relative heading between two spatially displaced vehicles.

A surface vessel has heretofore been employed in conjunction with one or more underwater craft, either towed or independently propelled, for various purposes, e.g., underwater exploration, security systems or the like. In such systems the relative heading between the surface and subsurface craft must often be determined to render meaningful azimuth-dependent data accumulated by the underwater vessel.

It is thus an object of the present invention to provide an improved heading-sensing arrangement.

More specifically, an object of the present invention is the provision of an electronic system for computing the relative heading between two craft which, in general, are displaced from each other in three dimensions.

The above and other objects of the present invention are realized in an illustrative heading-sensing arrangement for determining the orientation of a remote craft, either in absolute terms or relative to a second vessel. The remote ship includes two spaced acoustical energy-radiating transducers mounted orthogonal to the fore-aft direction in which the submerged vessel is pointing. The surface ship includes receiving transducers mounted abeam in a horizontal plane, and a third receiving transducer vertically displaced therefrom.

The two radiating acoustic transducers (projectors) are driven in a manner to render the emissions of each uniquely identifiable, as by time or frequency multiplexing the radiated signals. By examining the time relationship at which one or both of the emitted signals arrive at selected receiving transducers (hydrophones), information indicative of three coordinate spatial angles between the two bodies is determined. The specific heading of the submerged vehicle, in absolute terms and/or relative to the surface craft, is determined by suitably processing the data incorporated in the received, time-displaced signals.

The above and other objects, features and advantages of the present invention are realized in a specific, illustrative heading-sensing arrangement, described hereinbelow in conjunction with the accompanying drawing, in which.

Figure 1:
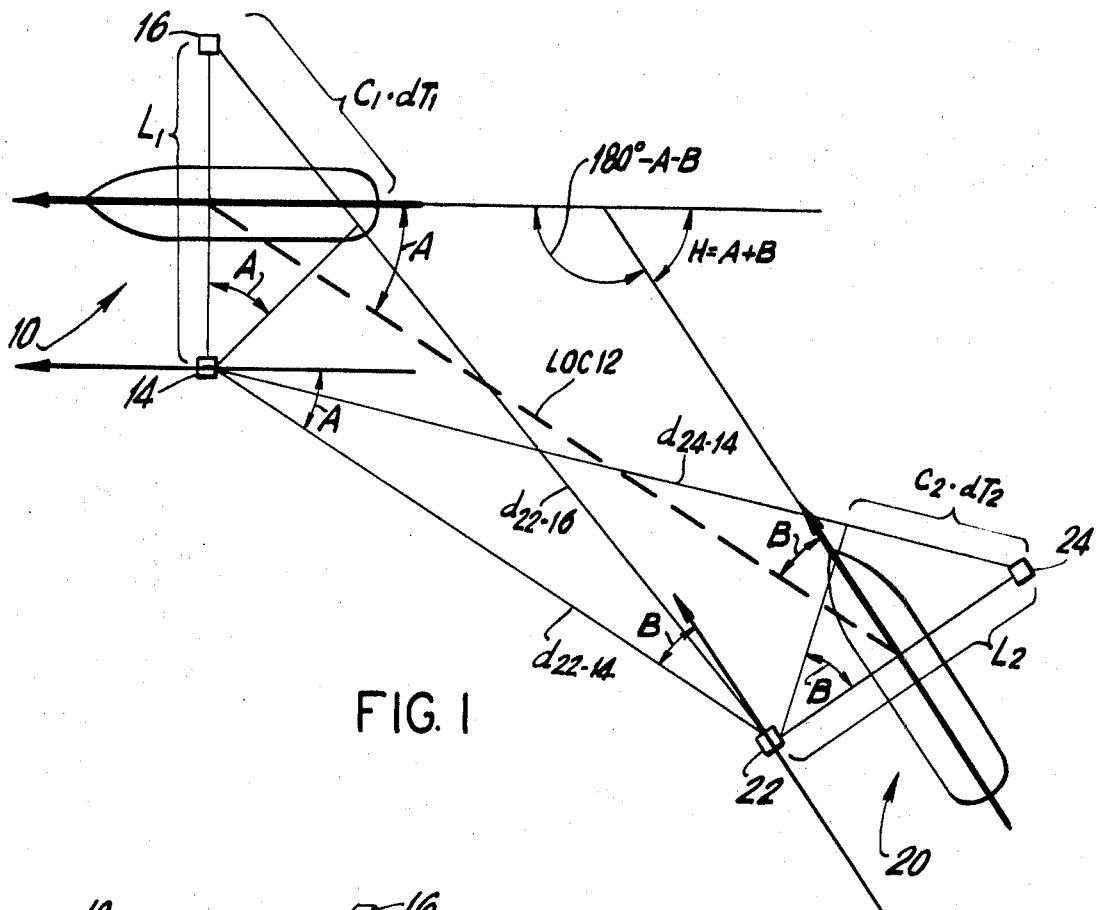
FIG. 1 depicts the spatial relationship between two coplanar vessels.

Referring now to FIG. 1 there is illustrated two vessels 10 and 20 which, for simplicity and by way of introduction, are coplanar. The ships 10 and 20 are traveling (or simply oriented at rest) in the direction indicated by the vectors along the fore-aft axis of each ship.

The relative heading between the ships 10 and 20 is given by an angle $H$ in FIG. 1, which is the angular displacement between the fore-aft axes of the two vessels. The relative heading angle $H$ may be viewed as the sum of two angles $A$ and $B$ respectively comprising the angles between the center fore-aft axes of the ships 10 and 20 and the dashed line of centers (LOC) axis 12 connecting the two craft. See also equivalent angles A and B shown in FIG. 1, wherein the angle A is the relative bearing from vessel 10 to vessel 20; and the angle $B$ is the relative bearing from vessel 20 to vessel 10.

The ship 20 includes acoustical signal-radiating projectors 22 and 24 spaced abeam across the craft through a distance $L_2$. The vessel 10 includes receiving hydrophones 14 and 16 located abeam of the ship with a relative spacing $L_1$. The vessel 10 further includes a hydrophone 18 (FIG. 2) vertically displaced from one of the hydrophones, e.g., the hydrophone 14, by a distance $L_3$. The function of the hydrophone 18 of FIG. 2 will be discussed hereinbelow.

For the coplanar case of two ships displaced in only two dimensions, the relative heading $H$ between the vessels 10 and 20 may be determined by suitable measurements for identifying the two angles $A$ and $B$. To determine these angles, the projectors 22 and 24 on the craft 20 emit pulses of acoustic sinusoidal energy which are uniquely identifiable, e.g., simultaneous pulses (signal envelopes) of a different characteristic frequency. Other modes of multiplexing, e.g., time division by separating the pulses by a known initial time interval, phase differentiation or the like may also be employed.

To identify the angle $A$ in FIG. 1, the hydrophones 14 and 16 on the vessel 10 are each adapted to receive the output of one of the signal-emitting projectors 22 and 24, e.g., the projector 22 in FIG. 1. Since the distance between the two vessels will, in general, be very large with respect to the lengths $L_1$ and $L_2$ by which the transducers are separated, there will be a plane wavefront, and the angles $A$ will be equal. The functional relationship between the angle $A$ and the time difference $dT_1$ at which pulses emitted from the projector 22 are received at the hydrophones 14 and 16 may be expressed as $$\sin A = \frac{c_1 \cdot dT_1}{L_1} \qquad \text{Equation (1)}$$

where $c_1$ is the speed of acoustical wave propagation for the emitted radiation in the area of the ship 10. Geometric significance for equation 1 is indicated in FIG. 1, wherein the quantity $c_1 \cdot dT_1$ is the difference in propagation distance for the signal generated by the projector 22 between the path connecting the transducers 22 and 14 (distance $d_{22-14}$) and the longer path between the transducers 22 and 16 (distance $d_{22-16}$).

Correspondingly, the angle $B$ between the center line of the vessel 20 and the line of centers 12 may be determined by receiving the signals emitted by both projectors 22 and 24 at one of the receivers, e.g., the hydrophone 14. By graphic analysis similar to that given above, it will be seen that the functional relationship between the angle $B$ and the time $dT_2$ at which signals from the projectors 22 and 24 arrive at the hydrophone 14 may be expressed as $$\sin B = \frac{c_2 \cdot dT_2}{L_2} \qquad \text{Equation (2)}$$

wherein $c_2$ is the speed of wave propagation in the vicinity of the vessel 20. For the general case considered below where one of the vessels is at or near the water surface and the other is submerged, the propagation speeds $c_1$ and $c_2$ about the two vessels may be considerably different because of temperature, pressure and other environmental variations.

Thus, for the coplanar situation of FIG. 1, the desired relative heading $H$ may be determined from the measured quantities $dT_1$ and $dT_2$, and from the known parameters $c_1$, $c_2$, $L_1$ and $L_2$ as follows:

$$H = \sin^{-1}\left[\frac{c_1 \cdot dT_1}{L_1}\right] + \sin^{-1}\left[\frac{c_2 \cdot dT_2}{L_2}\right]$$

Equation (3)

Figure 2:
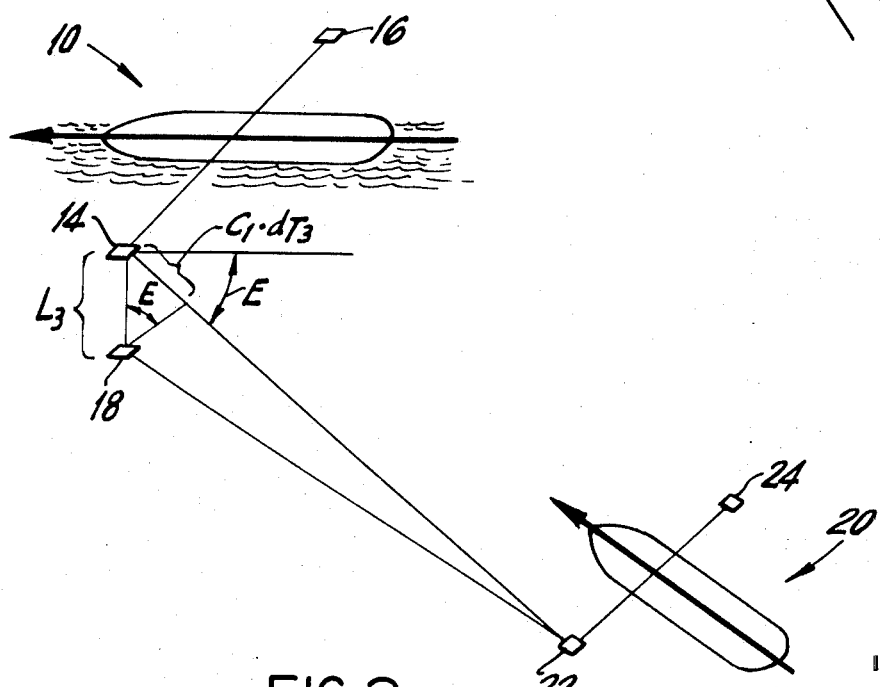
FIG. 2 depicts the two vessels of FIG. 1 displaced in three dimensions.

Referring now to FIG. 2, the vessels 10 and 20 are shown displaced in all three dimensions, this being the general case for the two craft. To determine the relative heading between the vessels 10 and 20, the slant bearing (or elevation angle) $E$ between the ships 10 and 20 must be determined. This is effected by employing two vertically displaced receiving hydrophones, e.g., the elements 14 and 18 separated by the distance $L_3$, and one of the radiating projectors, for example, the element 22. The relationship between the elevation angle $E$ and the time difference in arrival $dT_3$ of a signal from the projectors 22 to the hydrophones 14 and 18 is expressed as:

$$\sin E = \frac{c_1 \cdot dT_3}{L_3} \qquad \text{Equation (4)}$$

For the three dimensional situation, the desired relative heading $H$ between the surface and submerged vessels is the sum of two angles $H = H_A + H_B$ Equation (5) where the relative bearing angle $H_A$ is the angle $A$ as described above normalized to account for the change in the angle $A$ with the slant elevation $E$, and the relative bearing angle $H_B$ is the angle $B$ above projected to a horizontal plane to account for elevation. The relationships between the normalized angles $H_A$ and $H_B$, the measured and known parameters identifying the angles $A$ and $B$ above is expressible as $$\sin H_A = \frac{\sin E}{\cos A} \quad \text{Equation (6)}$$

and $$\sin H_B = \frac{\sin B}{\cos E} \quad \text{Equation (7)}$$

Inserting the relationships for $\sin A$, $\sin B$ and $\sin E$ of equations (1), (2) and (4) in equations (6) and (7), and recognizing that $$\cos E = \sqrt{1 - \sin^2 E} \quad \text{Equation (8)} \text{ we have}$$

$$H_A = \sin^{-1}\left[\frac{c_1 \cdot dT_1}{L_1 \sqrt{1 - \left[\frac{c_1 \cdot dT_3}{L_3}\right]^2}}\right]$$

Equation (9)

and $$H_B = \sin^{-1}\left[\frac{c_2 \cdot dT_2}{L_2 \sqrt{1 - \left[\frac{c_1 \cdot dT_3}{L_3}\right]^2}}\right]$$

Equation (10)

Combining equations (9) and (10) as in equation (5), the final mode of computing the desired relative heading angle $H$ in terms of the known quantities $L_1 - L_3$, $c_1$ and $c_2$ and the measured quantities $dT_1 - dT_3$ is of the form:

$$H = \sin^{-1}\left[\frac{c_1 \cdot dT_1}{L_1 \sqrt{1 - \left[\frac{c_1 \cdot dT_3}{L_3}\right]^2}}\right]$$

$$+ \sin^{-1}\left[\frac{c_2 \cdot dT_2}{L_2 \sqrt{1 - \left[\frac{c_1 \cdot dT_3}{L_3}\right]^2}}\right]$$

Equation (11)

Figure 3:
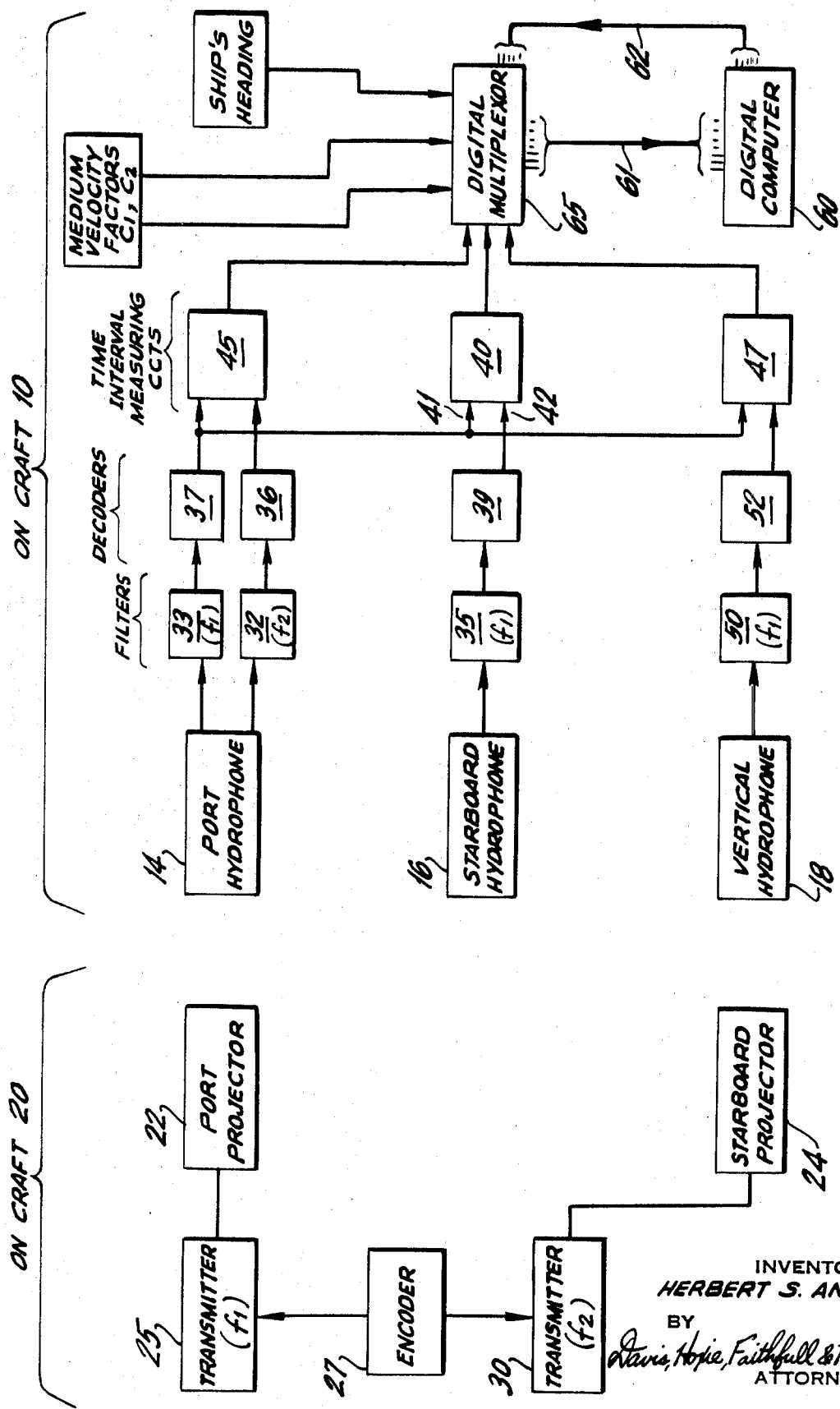
FIG. 3 is a block diagram depicting an electronic heading-sensing system for computing the relative heading between the vessels of FIGS. 1 and 2.

Apparatus for effecting the above-described time delay measurements and mathematical computations is shown in block diagram form in FIG. 3. The submerged vehicle 20 includes a transmitter 25 for selectively energizing the port projector 22 with a sinusoidal frequency $f_1$ when gated on by an encoder 27. Similarly, a transmitter 30 energizes the starboard signal-emitting projector 24 with a sinusoid of frequency $f_2$ when energized by the encoder 27. The encoder 27 may simply comprise an electronic switch for periodically gating the transmitters 25 and 30 on for supplying energizations to the projectors 22 and 24. Alternatively, some pulse coding may be effected by the encoder 27, and a corresponding inverse-operating decoding network employed at the receiver of the surface craft 10 to render the receiver responsive only to the specially encoded signals. This procedure renders the composite equipment less sensitive to noise thereby improving its signal-to-noise ratio. For example, the encoder may be adapted to gate the transmitters 25 and 30 such that the output signals comprise five consecutive sinusoidal signal bursts followed by a null interval, with the receiver including circuitry for counting the five bursts before passing the received information for further processing.

To derive the time delay information $dT_1$ containing information indicative of the angle $A$, (see FIG. 1 and equation 1), the port hydrophone 14 and the starboard hydrophone 16 on the surface vessel 10 supply their output signals to filters 33 and 35. The filters 33 and 35 supply an output pulse responsive to incoming signals of frequency $f_1$ which were generated by the transmitting projector 22. The output of the filter 33 is thus a pulse indicative of the time at which a corresponding pulse emitted by the projector 22 was received at the hydrophone 14 through the propagation distance $d_{22-24}$. Similarly, the output of the filter 35 comprises a pulse indicative of the time at which the pulse output from the projector 22 arrives at the hydrophone 16 via the propagation path length $d_{22-16}$.

The outputs from the filters 33 and 35 are decoded in elements 37 and 39, respectively, in accordance with the special encoding applied to the transmitted signals by the encoder 27, if any. These decoders may be deleted if no such special encoding was employed, and the transmitters 25 and 30 simply gated on periodically.

The difference in propagation time $dT_1$ between a signal from the projector 22 arriving at the hydrophones 14 and 16 is computed in a time interval computing circuit 40. In essence, the circuit 40 includes any well known embodiment for providing a measure of the duration elapsing between the times when a pulse is applied to two input terminals 41 and 42 thereof. For example, the interval measuring circuit may simply comprise a ramp generator wherein the first pulse starts a sweep circuit, and the second pulse resets the sweep. The maximum voltage amplitude attained by the sweep as measured, for example, by an amplitude peak detector and an analog-to-digital converter, provides a direct digital measure of the elapsed time interval. Alternatively, the time interval circuit may comprise a digital counter driven by a clock, preferably of adjustable repetition rate. The first encountered pulse initiates counting, and the count status of the counter is examined upon arrival of the second pulse. This final count state similarly provides being a direct measure of the desired time interval. Thus, the time interval measuring circuit 40 provides an output signal which is a direct digital measure of the elapsed time interval $dT_1$ essential for computing the angle $A$ and, eventually, the angles $H_A$ and $H$.

Examining the above equations, it is apparent that the quantity $dT_1$ is always multiplied by the factor $c_1$ and divided by the factor $L_1$. Either of these, or their ratio, may be built as scale factors into the interval measuring circuit 40.

Similarly, a time interval computing circuit 45 is employed to supply an output signal indicative of the time interval $dT_2$ associated with the computation of the angle $B$, possibly having one or both of the parameters $c_2$ and $L_2$ taken into account. The time interval measuring circuit 45 is supplied with a first pulse input from the filter 37 essentially indicative of the pulse propagation time along the path $d_{22-14}$, and also supplied with a pulse indicative of the propagation time from the transducer 24 to the receiver 14 along the path $d_{24-14}$ via the port hydrophone 14, a filter 32 adapted to respond only to the frequency $f_2$, and a decoder 36 if needed. Similarly, a time interval measuring circuit 47 responds to the output of the decoder 37 indicative of propagation along the path $d_{22-14}$, and to a signal indicative of propagation along the path $d_{22-18}$ from the projector 22 by developing a measure of the time difference $dT_3$ at its output. This time information is in part supplied to the interval measuring circuit 47 by a filter 50 adapted to identify signals of frequency $f_1$ received by the hydrophone 18, along with a decoder 52 where special encoding has been employed.

The digital outputs of the time interval computing circuits 40, 45 and 47, representative of the time intervals $dT_1$, $dT_2$ and $dT_3$ (assuming that the factors $C_1$, $c_2$ and $L_1-L_3$ are to be inserted into the bearing computation at a later point in data processing), are supplied via a digital multiplexer 65 and a plurality of leads 61 to a digital computer 60. Also selectively supplied to the computer 60 via the multiplexer 65 in digital format is the absolute heading of the ship 10 (e.g., relative to north), and the propagation velocities $c_1$ and $c_2$ (the lengths $L_1-_3$ are fixed and may be internally stored in the computer 60). These physical quantities, if available only in analogue form, may be converted to digital format by an analog-to-digital encoder. The multiplexer 65 well known to those skilled in the art, may simply comprise a series of coincidence gates for converging the several input variables onto the leads 61 under computer control as manifested by a plurality of selectively energized control leads 62.

The computer 60 may be a general purpose machine programmed to effect the computation indicated in equation (11) and, additionally, to add the heading of the ship 10 to the relative heading angle $H$ (equation 11) to obtain the heading of the vessel 20 in absolute terms.

Figure 4:
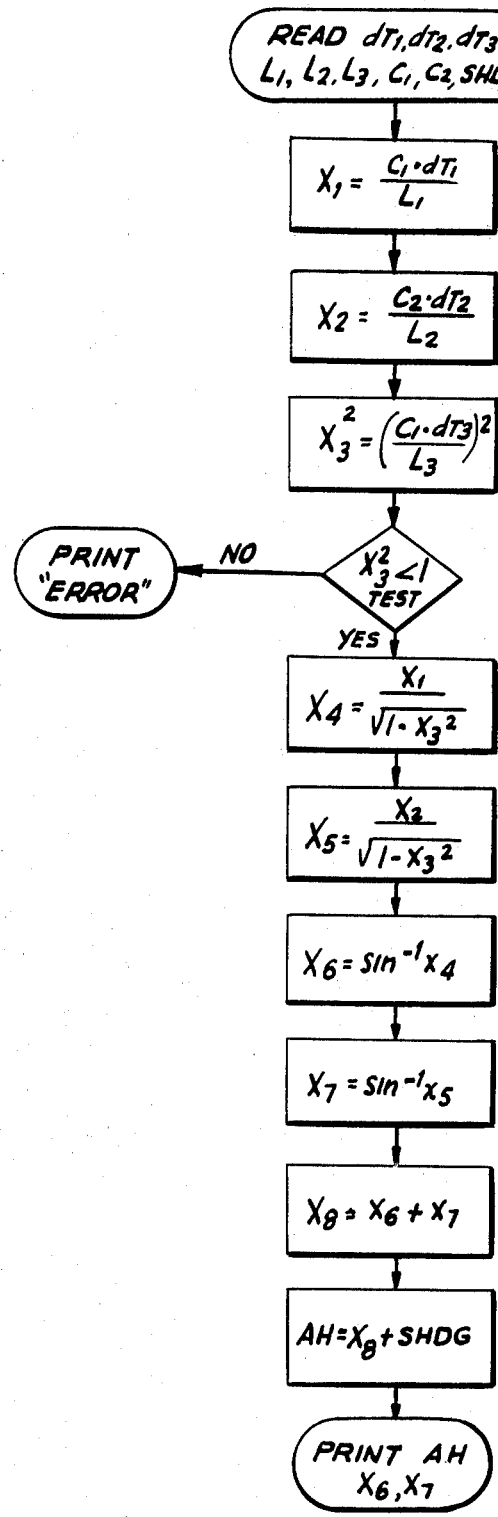
FIG. 4 is a flow diagram graphically depicting the computation effected by a digital computer in the arrangement of FIG. 3.

A flow chart showing the substance of this computation is shown in FIG. 4. The parameters are first read into storage (or already there for $L_1$, $L_2$ and $L_3$). The input variable SHDG identifies the heading of the vessel 10. Quantities $X_1$, $X_2$ and $X_3^2$ (corresponding to sin $A$, sin $B$, and sin$^2 E$) are first computed, and the quantity $X_3^2$ tested. If $X_3^2$ is greater than one, the radicals in equation 11 have imaginary answers only (an impossible condition) and an error output notation is made, as by a digital printer included in the computer 60.

If the test is satisfied, quantities $X_4$ (sin $H_A$); $X_5$ (sin $H_B$), $X_6$ ($H_A$), $X_7$ ($H_B$), $X_8$ ($H$), and $AH$ (absolute heading of the vessel 20) are computed and then printed out (and/or displayed if desired). The specific computations are indicated in the above equations, and also in FIG. 4.

An illustrative program for effecting the above computation, e.g., in FORTRAN IV compiler program language is as follows:

```
        WRITE (3,800)
    1   READ (2,100) NCASE
        IF(NCASE) 99, 99, 11
   11   READ(2,200) SC, SL, DST
        READ(2,200) BC,BL,DET,DTABE,BY,HS
        WRITE (3,300) NCASE,SC,BC,SL,BL,BV
        WRITE (3,400) DST,DBT,DTABE,HS
        TERM1=BC*DBT/BL
        TERM2=BC*DTABE/BV
        TERM2=TERM2*TERM2
        USQR=1.−TERM2
        IF (USQR) 3,2,2
    3   WRITE(1,500) NCASE
        GO TO 1
    2   X=TERM1/SQRT(USQR)
        CALL ASIN(X,T2,J)
        GO TO (5,6),J
    5   T2=T2*57.2957795
        TERM1=SC*DST/SL
        X=TERM1/ SQRT(USQR)
        CALL ASIN(X,T1,K)
        GO TO (7,6),K
    7   T1=T1*57.2957795
        H=HS+T1+T2
        WRITE (3,600) T1,T2,H
        GO TO 1
    6   WRITE(1,700)
        GO TO 1
   99   CALL EXIT
  100   FORMAT(12)
  200   FORMAT (6F10.0)  300  FORMAT(1HO,5X,'-
        CASE=, 12//6X,'C=', 8X,F9.4,5X, 'BIG C=',
        7X,F9.4/6X, '1L=', 8X,F9.4,5X,'BIG L=', 7X,F9.4/
        6X, 'V=',
        8X,F9.4)
  400   FORMAT(6X,'DELTA−T=',2X,F9.4,5X,'DELTA-
        BIGT='29.4/6X,'DELTA-TA2U='F9.4/6X,  'HS='
        ,F9.4/)
  500   FORMAT('NO REAL SOLUTION')
  600   FORMAT(6X, 'ARG 1= ',F6.2/6X,'ARG 2= 'F6.2/
        6X, 'H=',
        4X,F6.2)
  700   FORMAT('NO SOLUTION')
  800   FORMAT(1H1)
        END
```

Alternatively, a special purpose computer, e.g., of an analogue nature, may be built to effect the computation of FIG. 4, the input quantities being for this case supplied in analogue form.

Thus, the system of FIG. 3 has been shown by the above to compute the relative heading between the vessels 10 and 20 which may be physically displaced in three dimensions, and to supply the absolute heading of the vessel 10 if desired.

The above arrangement is only illustrative of the principles of the present invention. Numerous modifications and adaptations thereof will be readily apparent to those skilled in the art without departing from the spirit and scope of the present invention.

I claim:

1. In combination in a heading-sensing arrangement for determining the relative heading between first and second craft, first and second spaced signal emitting transducer means included on said second craft, multiplexing means for energizing said transmitting transducer means with signals which are uniquely distinguishable, first and second spaced receiving transducer means included on said first craft, each of said receiving transducer means including means for receiving the signals emitted by each of said transmitting transducer means and for separately developing an output signaling the time of arrival of each of said received signals, first timing means for taking a measure of the time interval between the reception of a signal emitted by one of said transmitting transducer means at said first and second receiving transducer means, second timing means for taking a measure of the time interval between the reception of signals emitted by each of said transmitting transducer means at one of said receiving transducer means, and computing means including means responsive to output signals from said first and second timing interval measure taking means for developing an output signal identifying the relative heading between said craft.

2. A combination as in claim 1 wherein said computing means includes means for effecting the computation $$H = \sin^{-1}\left[\frac{c_1 \cdot dT_1}{L_1}\right] + \sin^{-1}\left[\frac{c_2 \cdot dT_2}{L_2}\right]$$

wherein:

$H$ is the desired relative heading between two craft;

$c_1$ and $c_2$ are the wave propagation velocities in the vicinity of the first and second craft;

$L_1$ is the spacing between said first and second receiving transducer means;

$L_2$ is the spacing between said first and second transmitting transducer means; and $dT_1$ and $dT_2$ are the output signals developed by said first and second timing means, respectively.

3. A combination as in claim 1 wherein said first and second transmitting transducer means are located in a horizontal plane and wherein said first and second receiving transducer means are located in a horizontal plane.

4. A combination as in claim 3 wherein said first and second transmitting transducer means are mounted abeam on said second craft, and wherein said first and second receiving transducer means are mounted abeam on said first craft.

5. A combination as in claim 1 adapted to determine the relative heading between said first and second craft which may be displayed in three dimensions, further comprising means for developing a signal indicative of the elevation angle between said first and second craft, and wherein said relative heading-identifying means in said computing means further includes means responsive to output signals from said elevation angle-determining means.

6. A combination as in claim 5 wherein said elevation angle indicating means comprises third receiving transducer means included on said first craft and offset from the axis connecting said first and second receiving transducer means, and third timing means for taking a measure of the time interval between reception of a signal emitted by one of said emitting transducer means at said third and one of said first or second receiving transducer means.

7. A combination as in claim 6 wherein said computing means includes means for effecting the computation $$H = \sin^{-1}\left[\frac{c_1 dT_1}{L_1\sqrt{1-\left[\frac{c_1 dT_3}{L_3}\right]^2}}\right] + \sin^{-1}\left[\frac{c_2 dT_2}{L_2\sqrt{1-\left[\frac{c_1 dT_3}{L_3}\right]^2}}\right]$$

wherein:
$H$ is the desired relative heading between the two craft;
$c_1$ and $c_2$ are the wave propagation velocities in the vicinity of the first and second craft;
$L_1$ is the spacing between said first and second receiving transducer means;
$L_2$ is the spacing between said first and second transmitting transducer means;
$L_3$ is the spacing between said third receiving transducer means and one of said first or second receiving transducer means; and
$dT_1$, $dT_2$ and $dT_3$ are the output signals developed by said first, second and third timing means, respectively.

8. A combination as in claim 7 further comprising means for encoding the signals generated by said transmitting transducer means, and means for decoding the signals received by said receiving transducer means.

9. A combination as in claim 8 wherein said multiplexing means includes means for energizing said transmitting transducer means with signals of a different frequency, and where each of said receiving transducer means includes filter means responsive to each of said emitted frequencies.

10. A combination as in claim 9 wherein said first and second transmitting transducer means are located in a horizontal plane and wherein said first and second receiving transducer means are located in a horizontal plane.

11. A combination as in claim 10 wherein said first and second transmitting transducer means are mounted abeam on said second craft, and wherein said first and second receiving transducer means are mounted abeam on said first craft.

UNITED STATES PATENT OFFICE
CERTIFICATE OF CORRECTION

Patent No. 3,569,920              Dated    March 9, 1971

Inventor(s)   Herbert S. Antman

It is certified that error appears in the above-identified patent and that said Letters Patent are hereby corrected as shown below:

Column 4, line 67, "$C_1$" should read -- $c_1$ --; line 74, "$L_1 -3$" should read -- $L_1 -L_3$ --. Column 5, line 34, "DET" should read -- DBT --; line 34, "BY" should read -- BV --; line 61, cancel "300 FORMAT(1H0,5X,'-" and insert the same below line 61. same column 5, line 67, "29" should read -- , 2X,F9 --.

Signed and sealed this 7th day of December 1971.

(SEAL)
Attest:

EDWARD M. FLETCHER, JR.           ROBERT GOTTSCHALK
Attesting Officer                  Acting Commissioner of Pa

UNITED STATES PATENT OFFICE
CERTIFICATE OF CORRECTION

Patent No. 3,569,920              Dated March 9, 1971

Inventor(s) Herbert S. Antman

It is certified that error appears in the above-identified patent and that said Letters Patent are hereby corrected as shown below:

Column 3, line 10, "$\frac{\sin E}{\cos A}$" should read -- $\frac{\sin A}{\cos E}$ --.

Signed and sealed this 12th day of September 1972.

(SEAL)
Attest:

EDWARD M. FLETCHER, JR.                ROBERT GOTTSCHALK
Attesting Officer                      Commissioner of Patents